United States Patent
Kim et al.

(10) Patent No.: US 7,738,786 B2
(45) Date of Patent: Jun. 15, 2010

(54) CAMERA LENS ASSEMBLY FOR PORTABLE TERMINAL

(75) Inventors: Jae-Shik Kim, Seongnam-si (KR); Hong-Bae Kim, Yongin-si (KR); Chang-Suk Bae, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 875 days.

(21) Appl. No.: 11/483,485

(22) Filed: Jul. 10, 2006

(65) Prior Publication Data

US 2007/0009250 A1    Jan. 11, 2007

(30) Foreign Application Priority Data

Jul. 8, 2005    (KR)    ...................... 10-2005-0061636

(51) Int. Cl.
    *G03B 29/00*    (2006.01)
(52) U.S. Cl. ..................................... 396/429
(58) Field of Classification Search ................. 396/529, 396/427–429; 348/14.02, 344, 373–376; 359/822
    See application file for complete search history.

(56) References Cited

U.S. PATENT DOCUMENTS

| 4,264,175 A | * | 4/1981 | Hayata et al. ................. 396/73 |
| 2005/0049019 A1 | * | 3/2005 | Lee .......................... 455/575.4 |
| 2005/0225668 A1 | * | 10/2005 | Kim ........................... 348/373 |

FOREIGN PATENT DOCUMENTS

KR    1020010028989    4/2001

* cited by examiner

*Primary Examiner*—W. B. Perkey
(74) *Attorney, Agent, or Firm*—The Farrell Law Firm, LLP

(57) ABSTRACT

Disclosed is a camera lens assembly of a portable terminal, which includes a lens housing; and a drive plate provided at a position adjacent to the lens housing, wherein the lens housing rotates as the drive plate moves linearly. Because of the camera lens assembly, the lens housing need not be directly manipulated to rotate the lens housing. Therefore, since the lens housing is installed in the housing of the terminal, even in a state in which the lens housing is rotatably installed on the housing of the terminal, damage and breakage due to exterior impacts can be prevented and the restrictive terminal design problem due to the lens housing is overcome.

6 Claims, 6 Drawing Sheets

CAMERA LENS ASSEMBLY FOR PORTABLE TERMINAL

PRIORITY

This application claims priority to an application entitled "CAMERA LENS ASSEMBLY OF PORTABLE TERMINAL" filed with the Korean Intellectual Property Office on Jul. 8, 2005 and assigned Ser. No. 2005-61636, the contents of which are incorporated herein by reference.

BACKGROUND OF THE INVENTION

1. Field of the Invention

The present invention relates to a portable terminal, and more particularly to a camera lens assembly for a portable terminal which includes a lens housing rotatably engaged with a housing of the terminal.

2. Description of the Related Art

In general, the term "portable terminal" refers to a device that provides radio communication functions through a mobile communication base station between one user and another user, or between a user and a service provider. Various types of content, such as a voice communication service, short message transmission, mobile banking, TV, online gaming, VOD (video on demand), etc., are provided through the portable terminal.

Portable terminals are classified according to their shapes, and include a bar-type terminal in which communication circuits and input/output devices such as a microphone unit and a speaker unit are installed in one housing, a flip-type terminal in which a flip cover is installed in the bar-type terminal, and a folder-type terminal which is opened and closed as a pair of housings are rotated and in which input/output devices are distributed in the housings. Recently, a slider-type terminal has appeared together with the folder-type terminal to improve the portability and convenience of the terminal and satisfy the tastes of users.

In addition, various mobile communication services such as games and moving picture file transmission through the Internet to the portable terminal, mobile banking, VOD, DMB (digital multimedia broadcasting), etc., have been provided. The mobile communication services have become varied as use of portable terminal have become common, the tastes of users are varied, and services providing various contents through the portable terminal can be commercialized.

As information communication technology becomes integrated, the portable terminal functions not only as a simple communication device but also as a complex device including such functions as a camera function, and may also operate as a storage device. Among the complex functions, a camera lens assembly is becoming an indispensable element of the terminal.

The camera lens assembly mounted to a portable terminal may be classified into a fixed-type and a rotation-type. The fixed-type camera lens assembly is installed on one surface of a housing of a terminal and limits damage due to an exterior impact, but is inconvenient in that the direction of the terminal must be changed so that the camera lens thereof points toward the subject being photographed. On the other hand, the rotation-type camera lens assembly is rotatably installed on a housing of the terminal and has an advantage in that a subject can be photographed by rotating a lens housing in various directions without moving the terminal. However, this assembly has a risk of being damaged by an exterior impact, since the lens is exposed to the outside. Moreover, since the rotation-type camera lens assembly is exposed outside the housing of the terminal, diversity of the terminal design is restricted.

SUMMARY OF THE INVENTION

Accordingly, the present invention has been made to solve the above-mentioned problems occurring in the prior art, and an object of the present invention is to provide a camera lens assembly for a portable terminal which can be rotatably mounted to the housing of the terminal and prevent damage and breakage thereof due to exterior impacts.

Another object of the present invention is to provide a camera lens assembly for a portable terminal which can be rotatably mounted to a housing of the terminal and contribute to diversification of terminal designs.

In order to accomplish these objects, there is provided a camera lens assembly of a portable terminal, which includes a lens housing; and a drive plate provided at a position adjacent to the lens housing, wherein the lens housing rotates as the drive plate moves linearly.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein is omitted to avoid making the subject matter of the present invention unclear.

Figure 1:
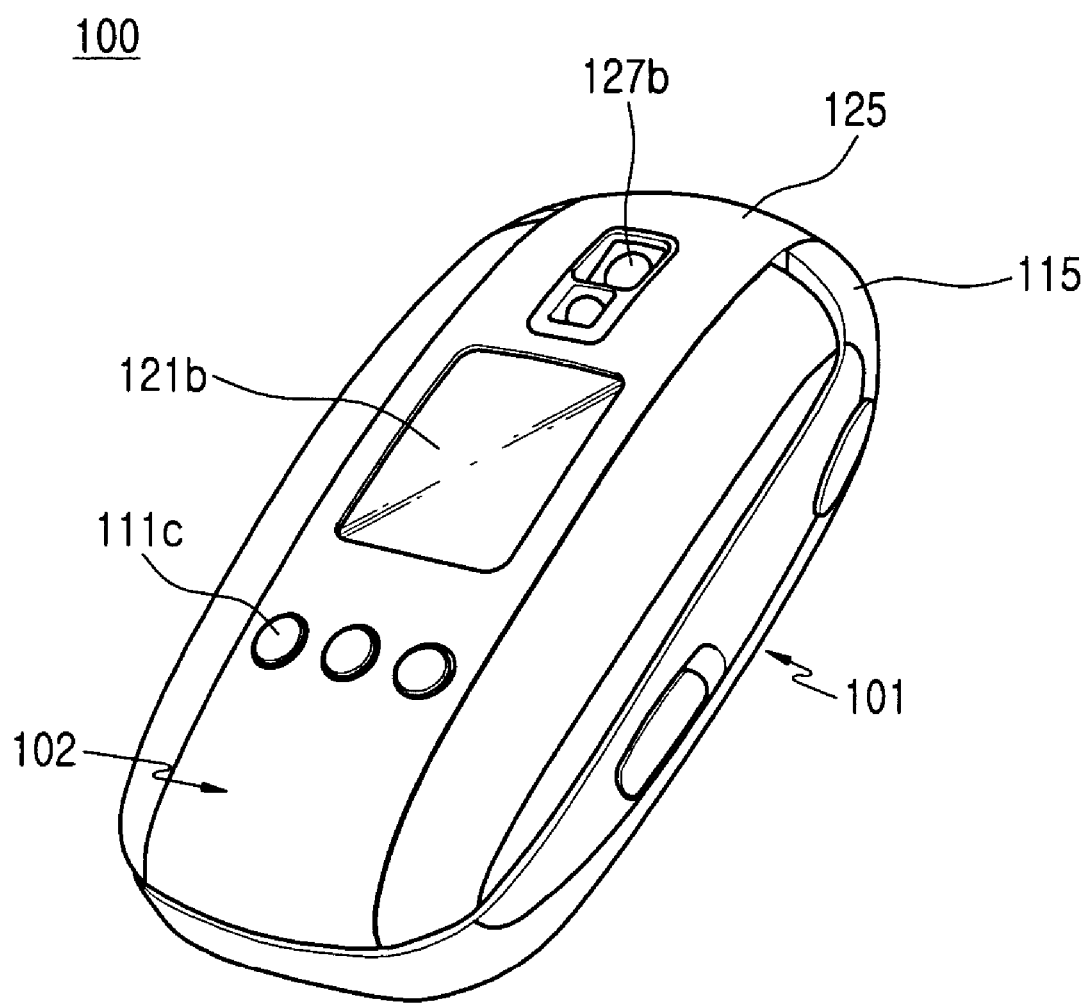
FIG. 1 is a perspective view showing a portable terminal including a camera lens assembly according to a preferred embodiment of the present invention.
Figure 2:
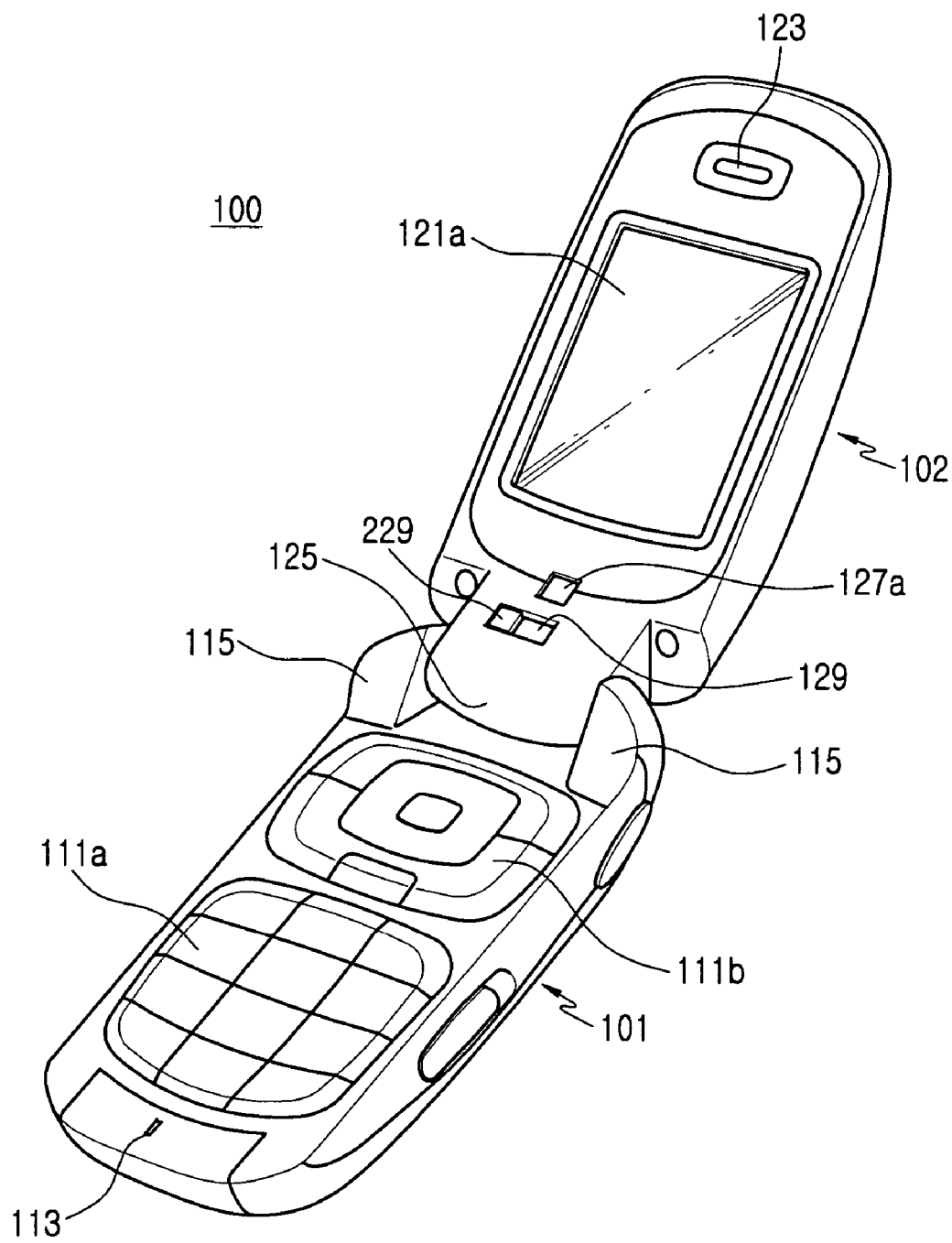
FIG. 2 is a perspective view showing the portable terminal of FIG. 1 in which a second housing opens a first housing.
Figure 3:
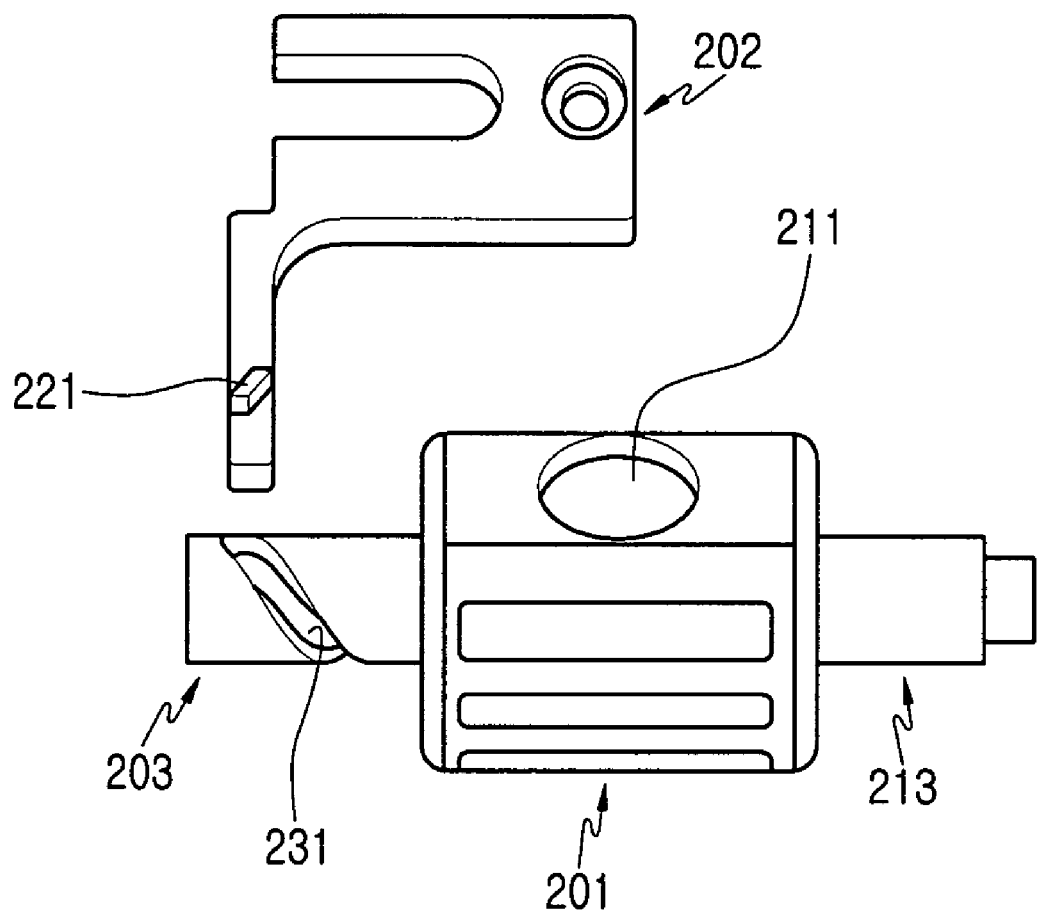
FIG. 3 is a perspective view showing a camera lens assembly according to a preferred embodiment of the present invention.
Figure 4:
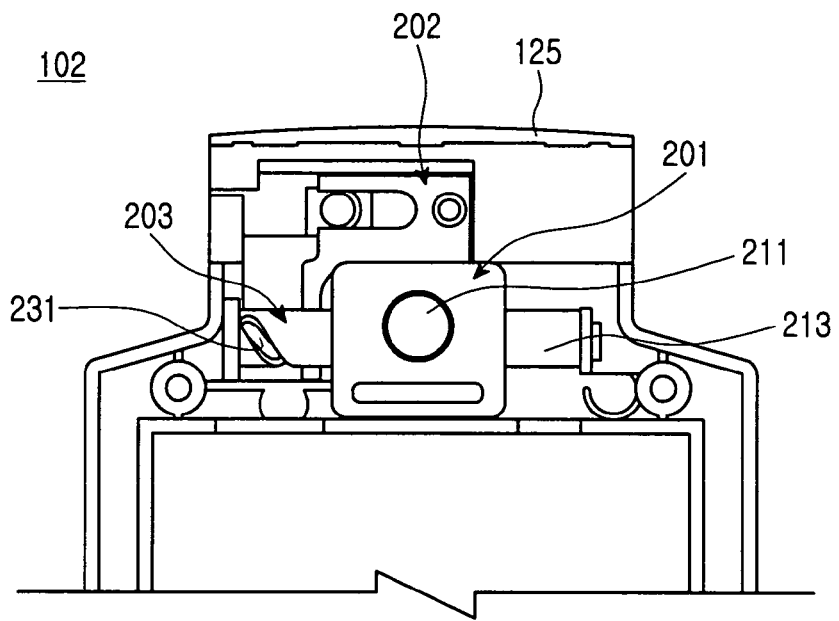
FIG. 4 is a perspective view showing the assembled state of the camera lens assembly shown in FIG. 3.
Figure 5:
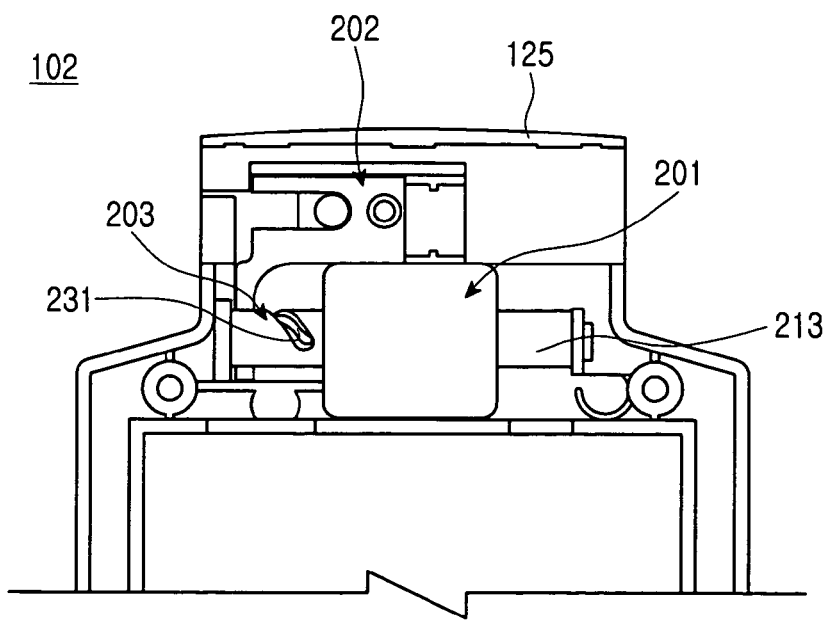
FIG. 5 is a perspective view showing the camera lens assembly of FIG. 4 in which a lens housing thereof is rotated.

FIGS. 1 and 2 are perspective views showing a portable terminal 100 including a camera lens assembly 200 (refer to FIG. 3) according to a preferred embodiment of the present invention. As shown in FIGS. 1 and 2, the portable terminal 100 is preferably a folder-type terminal in which first and second housings 101 and 102 are foldably engaged with each other.

The first housing 101 includes a number/letter input key pad 111a, a function key pad 111b, and a microphone unit 113 on one side thereof, and a pair of side hinge arms 115 are formed at the upper portion of the first housing 101. The second housing 102 includes a main display 121a on one surface thereof, and the main display 121a faces the key pads 111a and 111b when the housings are closed. A speaker unit 123 is installed on one side of the main display 121a. A center hinge arm 125 is formed at one end portion of the second housing 102, is supported by the side hinge arms 115, and is rotatably engaged with the first housing 101. The second housing 102 includes a sub-display unit 121b and simple function keys 111c on the other surface thereof. The function keys 111c can be used to search for and reproduce music files, etc.

As the center hinge arm 125 is rotatably engaged between the side hinge arms 115, the second housing 102 is foldably mounted to the first housing 101. In the state in which the second housing 102 is folded to the first housing 101, the key pads 111a and 111b and the main display 121a are closed.

On the other hand, exposing windows 127a and 127b and guide hole 129 are formed in the second housing 102 in order to install the camera lens assembly 200. The exposing windows 127a and 127b are formed on the inner and outer surfaces of the second housing 102, respectively. Namely, as the lens housing 201 of the camera lens assembly 200 is rotatable, a subject can be photographed in the outer surface direction or the inner surface direction of the second housing 102. In addition, if the camera lens assembly 200 is installed at a position adjacent to the periphery of the second housing 102, an exposing window may be installed on the side surface of the second housing 102.

Hereinafter, the camera lens assembly 200 will be described with reference to FIGS. 3 to 8. The camera lens assembly 200 includes a lens housing 201 rotatably installed in the second housing 102, a drive plate 202 for rotating the lens housing 201, and a rack 203.

An exposing opening 211 is formed on the outer peripheral surface of the lens housing 201 and a camera lens (not shown) is embedded in the lens housing 201. An assembling hole (not shown) for engaging the rack 203 is formed on an end surface of one side of the lens housing 201, and a rotation support shaft 213 extends on an end surface of the other side of the lens housing 201. The rack 203 includes an assembling boss 233 (refer to FIG. 6) formed at one end thereof. As the assembling boss 233 is engaged with and fixed to the assembling hole, the rotations of the rack 203 and the lens housing 201 are mutually restricted. The rack 203 is fixed to an end surface of one side of the lens housing 201 to support the rotation of the lens housing 201 together with the rotation support shaft 213.

At least one screw recess 231 is formed on the outer peripheral surface of the rack 203 to rotate the lens housing 201 together with the drive plate 202. The drive plate 202 is installed so as to be linearly moved on the second housing 102, and a regulation knob 229 (refer to FIG. 2) protruding on one surface of the second housing 102 is located in the guide hole 129. Therefore, a user can linearly move the drive plate 202 using the regulation knob 229.

A guide boss 221 is provided on the drive plate 202 and is engaged with the screw recess 231. If the drive plate 202 moves linearly, the rack 203 is rotated to maintain the engaged state of the guide boss 221 and the screw recess 231. Namely, if a user linearly moves the regulation knob 229, the rack 203 is rotated and thus the lens housing 201 is also rotated on the second housing 102. Therefore, a user can rotate the lens housing 201 even in the state in which the lens housing 201 is not exposed outside the terminal 100.

Figure 6:
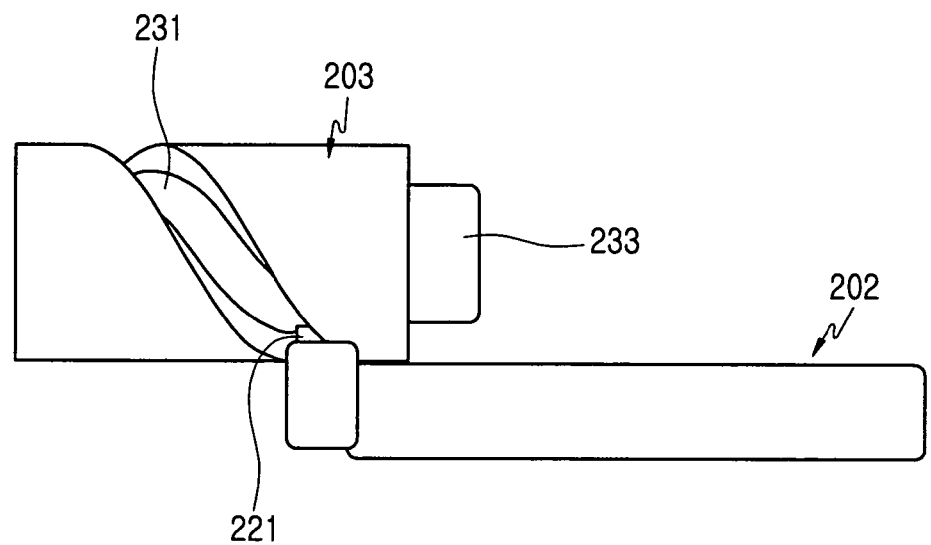
FIGS. 6 to 8 are views sequentially showing operations of a drive plate and a rack of the camera lens assembly of FIG. 3.
Figure 7:
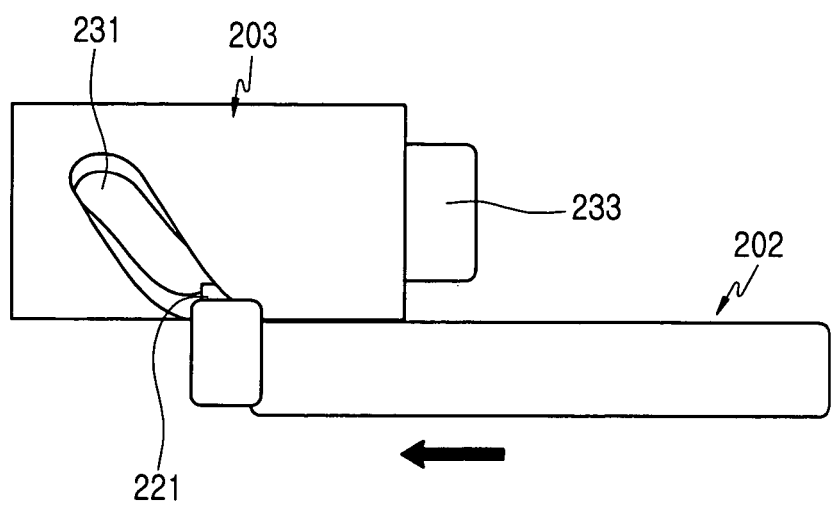
Figure 8:
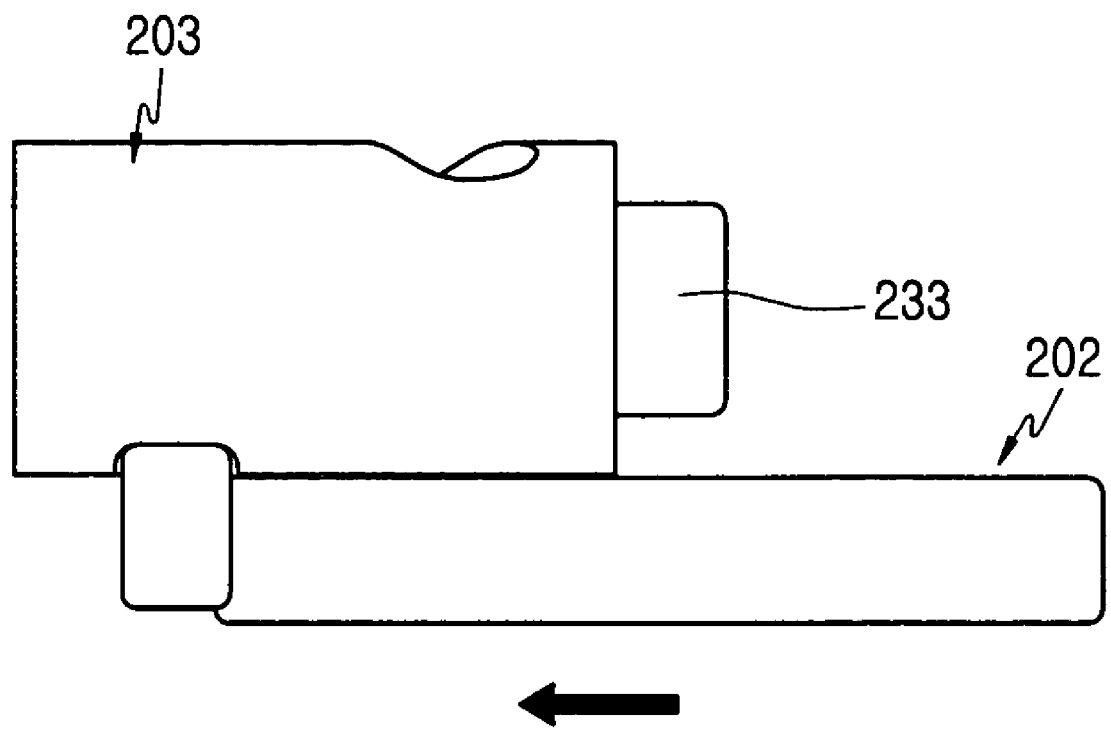

As shown in FIGS. 6 and 8, it is preferred that if the drive plate 202 is linearly moved and the rack 203 is rotated, the rack 203 can be rotated greater than 180 degrees in the movement range of the drive plate 202. Thus, the lens housing 201 can photograph a subject selectively through the exposing windows 127a and 127b formed in the second housing 102.

The rotation range of the lens housing 201 is restricted by a range in which the screw recess 231 is formed on the outer peripheral surface of the rack 203 or a movement range of the drive plate 202. Namely, if the screw recess 231 is formed along the outer circumferential direction of rack 203 by 180 degrees, the lens housing 201 can also be rotated 180 degrees. However, if the movement range of the drive plate 202 is restricted, the rotation range of the lens housing 201 can be restricted within 180 degrees. Similarly, even when the movement range of the drive plate 202 is sufficiently secured, if the range in which the screw recess 231 is formed is within 180 degrees, the rotation range of the lens housing 201 is restricted within 180 degrees.

As mentioned above, according to the camera lens assembly of a portable terminal of the present invention, since the driving plate is installed so as to be linearly moved in order to rotate the lens housing, the lens housing need not be directly manipulated to rotate the lens housing. Therefore, since the lens housing is installed to be rotatably installed on the housing of the terminal, damage and breakage due to exterior impacts, etc. can be prevented. Further, since the lens housing is not exposed directly to the outside of the terminal, the problem of the terminal design being restricted due to the lens housing is overcome.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A portable terminal comprising:
    a terminal housing including:
    exposing windows formed on opposite side surfaces of the terminal housing;
    a lens housing rotatably received in the terminal housing;
    a drive plate provided at a position adjacent to the lens housing; and
    a regulation knob protruding on one surface of the terminal housing,
    wherein use of the regulation knob linearly moves the drive plate to rotate the lens housing and a subject is photographed through one of the exposing windows selected as the lens housing rotates.

2. The portable terminal according to claim 1, further comprising a rack provided on one side of the lens housing to rotate the lens housing as the drive plate moves linearly.

3. A camera lens assembly for a portable terminal, the camera lens assembly comprising:
   a lens housing with a drive plate positioned adjacent thereto, wherein the lens housing rotates as the drive plate moves linearly;
   a rack provided on one side of the lens housing to rotate the lens housing as the drive plate moves linearly;
   a guide boss provided in the drive plate; and
   at least one screw recess formed on an outer peripheral surface of the rack,
   wherein the guide boss is engaged with the screw recess so that the rack and the housing rotate when the drive plate moves linearly.

4. The camera lens assembly according to claim 3, wherein the screw recess is formed on the outer surface of the rack along the circumferential direction of the rack for greater than 180 degrees.

5. A camera lens assembly for a portable terminal, the camera lens assembly comprising:
   a lens housing with a drive plate positioned adjacent thereto, wherein the lens housing rotates as the drive plate moves linearly;
   a rack provided on one side of the lens housing to rotate the lens housing as the drive plate moves linearly;
   an assembling hole formed on an end surface of one side of the lens housing; and
   an assembling boss provided at one end of the rack to be engaged with the assembling hole,
   wherein the assembling hole and the assembling boss are engaged with each other, thereby preventing the lens housing and the rack from rotating with respect to each other.

6. The portable terminal according to claim 1, further comprising a rotation support shaft extending from an end surface of the lens housing.

* * * * *